United States Patent [19]

Tucker

[11] 4,070,564

[45] Jan. 24, 1978

[54] ANTI-THEFT CASH REGISTER

[76] Inventor: John S. Tucker, 5527 Forrest Haven Circle, Tampa, Fla. 33615

[21] Appl. No.: 702,710

[22] Filed: July 6, 1976

[51] Int. Cl.$^2$ .................. G06F 15/30; G07D 1/06
[52] U.S. Cl. .................................. 364/405; 133/2; 235/7 A
[58] Field of Search .................. 235/156, 168, 7 R; 133/2, 4 A, 8 R; 340/172.5

[56] References Cited

U.S. PATENT DOCUMENTS

| 3,242,929 | 3/1966 | Adams | 133/2 |
| 3,368,570 | 2/1968 | Nagy et al. | 133/2 |
| 3,828,166 | 8/1974 | Johansson et al. | 235/7 A |
| 3,963,035 | 6/1976 | Levasseur | 133/2 |

*Primary Examiner*—Jerry Smith
*Attorney, Agent, or Firm*—John Orman

[57] ABSTRACT

This invention relates to an anti-theft cash register of the type for use at the point of sale for calculating and collecting the total charges for the sale. The cash register includes a vault for storing money therein and a deposit system for receiving and inserting the money into the vault. The deposit system also generates a money deposit signal responsive to the money being deposited in the vault. An electronic computer is provided for processing data input signals to calculate a sales total, for comparing the money deposit signal with the total, and for generating change signals responsive thereto. A withdrawal system is also included for removing and disbursing the money from within the vault responsive to receiving the change signals from the computer. An alarm system is provided for generating warning signals in response to an unauthorized entry into the vault.

18 Claims, 5 Drawing Figures

ANTI-THEFT CASH REGISTER

BACKGROUND OF THE INVENTION

1. Field of the Invention

This invention relates to cash registers and in particular to cash registers of the type having automated subsystems for receiving and depositing money into a vault connected thereto and disbursing the money as required.

2. Description of the Prior Art

Point of sale cash registers have become common fixtures in all types of businesses, but especially in retail stores. These point of sale cash registers generally include mechanical or electronic calculating systems for determining the total charge for the sale. Many cash registers of this type also include a separate function capability for determining and indicating the amount of change to be refunded to the customer following his payment for the sale. Conventional cash registers often utilize multiple sliding cash drawers having individual compartments therein for receiving and holding the money. These cash drawers are convenient in that they allow the sales person to quickly deposit and withdraw money at the close of the sales transaction. However, these cash drawers are highly susceptable to unauthorized withdrawals, caused by robberies, burglaries, and employee dishonesty. While most point of sale cash registers incorporate provisions for locking the cash drawers, generally these provisions are not sufficient to withstand an attempt by a knowledgable thief intent upon obtaining the cash contained therewithin.

In contrast, the present invention relates to a cash register which employs an electronic calculator for performing the usual totalizing and calculating functions together with a closed vault which safely stores the money received from the sales transaction. Automatic subsystems are provided for sorting and counting the money as it is deposited within the vault and for retrieving the money for disbursement to the customer when change or a refund is required. At no time is the sales person capable of accessing the money within the vault except through initiating a transaction through the cash register. An alarm system is also provided for signaling any unauthorized access to the money within the vault, whether the access is physical in nature or merely procedurely incorrect.

BRIEF DESCRIPTION OF THE DRAWINGS

Other objects features and advantages of the present invention will be apparent from a study of the written description and the drawings in which.

SUMMARY OF THE INVENTION

Figure 1:
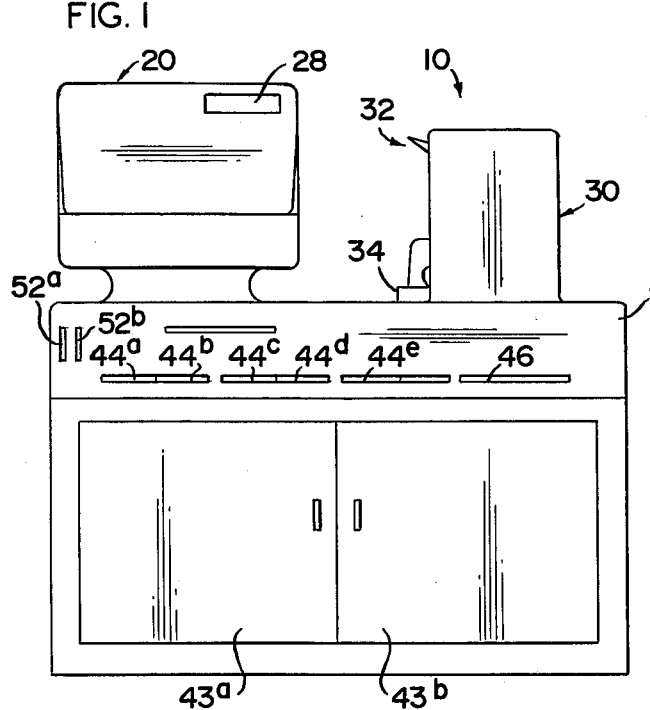
FIG. 1 illustrates a frontal view of a first preferred embodiment of the anti-theft cash register.
Figure 2:
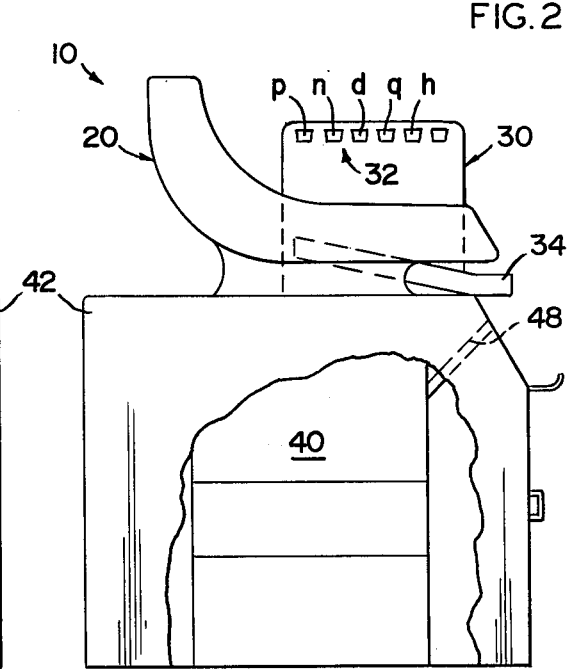
FIG. 2 illustrates a side view of the anti-theft cash register.

A first preferred embodiment of an anti-theft cash register in accordance with the present invention is shown generally as 10 in FIGS. 1 and 2. The cash register 10 includes a keyboard section 20 having a digital display 28 coupled thereto for reading out the data inserted into the keyboard and the calculations performed on this data. The keyboard 20 includes a plurality of push button switches for representing the arabic numerals 0–9 (not shown), together with a plurality of function push button switches for representing various mathematical functions to be performed on the input data, such as addition, subtraction, multiplication, division, subtotal, final total, amount received, change due, etc. The keyboard 20 also includes a plurality of transaction switches which will be discussed in detail with reference to the schematic diagrams of the electronic systems.

The cash register 10 also includes a coin changer 30 which includes a plurality of coin input slots, shown generally as 32, for receiving pennies, nickles, dimes, quarters and half dollars therein. The coin changer 30 also includes a single coin disbursal shute 34 for disbursing the coins, as required, to the customer.

The cash register 10 also includes a vault 40 comprising a generally rectangular void defined within a base section 42. The vault 40 may include a section for receiving the coins therein, or the coins may be stored in a separate external vault section as illustrated in FIGS. 1 and 2. A base section 42 of the vault 40 includes a plurality of money passageways 44a–44e for receiving therein paper money, such as $1.00, $2.00, $5.00, $10.00, $20.00 or other bills of legal tender, for passing these bills into the vault 40. Another money passageway 46 is included for receiving drafts, such as credit card drafts or due bills for transport into the vault 40. The base 42 also includes therein a money discharge conduit 48 for disbursing paper money or bills from the vault 40. The base 42 also includes key receptacles 52a, b for receiving therein keys of the type illustrated generally as 50 in FIG. 5.

Each of these keys 50 include a stem section 52 having along the periphery thereof a plurality of conductor zones 54. Selected ones of the conductor zones 54 are electrically coupled by printed circuit type electrical conductors 56. These conductors 56 are used to complete circuits within the key receptacles 52 which couple with the conductor zones 54 when the keys 50 are inserted therein. Of course, on the center portion of the stem section 52 the printed circuit type conductors 56 may be consealed to prevent unauthorized duplication of the printed circuit elements contained thereon.

Figure 3:
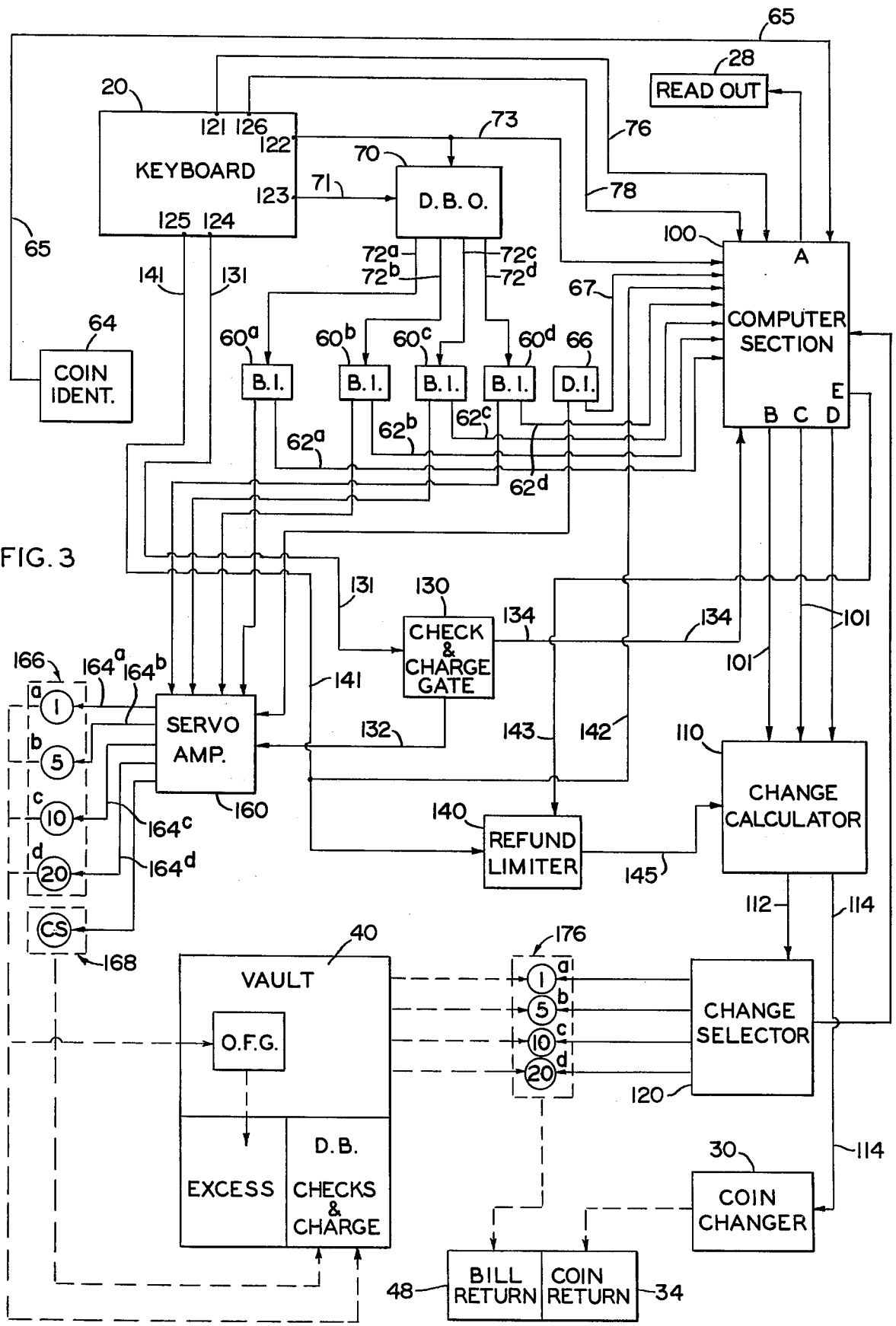
FIG. 3 represents a schematic block diagram illustrating the functional operation of the first preferred embodiment of the anti-theft cash register.

FIG. 3 illustrates a schematic block diagram representing the electrical subsystems which are physically located within the keyboard 20 and the base 42 of the cash register 10. Each of the money passageways 44a–e includes a bill identification unit 60a-d (or demonination identification means) for identifying that the bills inserted into the money passageways 44 paired therewith are in fact bills of the proper demonination. These bill identifiers 60 are well known in the art and generally comprise photo-electric devices which correlate the bill designs with stored information. Each of the bill identifyers 60 generates a confirmation signal which is transmitted through electrical conductors 62a-d paired therewith to the appropriate inputs of a computer 100. In a similar manner the coins deposited into the inputs 32 of the coin changer 30 are identified as to demonination by a coin identifier 64, with a corresponding confirmation signal being transmitted through a conductor 65 to a corresponding input of the computer 100. Also, a draft identifier 66 is coupled to the passageway 46 which is used for receiving and transporting drafts into a special section of the vault 40. Unlike the bill identifiers 60, the draft identifier 66 is merely a photo-electric unit for determining if a draft has been inserted into the vault 40. Responsive to detecting a draft passing adjacent thereto, the draft identifier 66 generates a confirmation signal which is coupled through the conductor 67 to the appropriate input of the computer 100.

Each of the bill identification units 60a-d is also controlled by a damaged bill override system 70 which in turn is actuated by a damaged bill function switch 123 on the keyboard 20. If a damaged bill were received by the operator and inserted into the appropriate money passageway 44, the bill identifier 60 would reject and return the bill; however, if the operator first depresses the damaged bill switch 123 on the keyboard 20, the damaged bill override system 70 will disable each of the bill identifiers 60 coupled thereto by the cables 72a-d. A "change only" function switch 122 located on the keyboard 20 is coupled to the damaged bill override system 70 and the computer 100 by a cable 73. When the change only switch 122 is actuated, the damaged bill override system 70 will disable the bill identifiers 60, thereby making it impossible to receive change, for a damaged bill or for using the damaged bill override system 70 to defraud the machine. The actuation of the change only switch 122 also signals the computer to not issue any change.

The keyboard 20 also includes the plurality of the numerical switches 121 which are coupled to an input of the computer 100 by the cable 76. These switches 121 are used to insert the price and other data concerning the individual articles being purchased into the computer 100 in a sequential manner. After all of the data concerning these articles has been loaded into the computer 100, a total switch may be depressed for commanding the computer 100 to calculate the total charge for the items. Sales tax or other variable charges may also be computed by the computer. Each of the data items inserted in the computer 100 is simultaneously displayed by the numerical readout 28 attached to the keyboard 20. A tape printer (not shown) may also be coupled to the computer 100. A reset switch 126 on the keyboard 20 is coupled to an input of the computer 100 by a circuit line 78 for instructing the computer to cancel the previously inserted command or data. The computer 100 is programmed to disregard the reset switch 126 command after money has been inserted into the vault 40.

The computer 100 receives the data input from the keyboard 20 or from some other data input source, such as an optical readout system of the type used for reading optical codes inscribed upon the labels of products. The computer 100 will total the prices of each of the articles. Each of the totals corresponding to a single sale may also be added to an accumulator storage within the computer 100 for calculating a daily sales total. After a total has been calculated for a particular sale, the operator receives the money from the purchaser and inserts the money into the appropriate money passageways 44a-d which causes the bill identifiers 60a-d to generate confirmation signals to the computer 100. The computer 100 will total the signals from each of the demoninations of the bills received, and then will compare the total cash received to the total charges for the good purchased. Responsive to this comparison the computer 100 will generate a change signal representative of the change to be refunded to the customer. If the customer pays for the purchases by a check or charge draft, the operator actuates the check and charge switch 124 on the keyboard 20 which is coupled by the circuit line 131 to a check and charge gate 130. The check and charge gate 130 will then generate a disable signal which is coupled through the circuit line 132 to servo amplifiers 160, thereby disabling the cash deposit function of the cash register. This disabled signal will also be coupled from the check and charge gate 130 by a circuit conductor 134 to the computer 100 for signaling the computer to expect a confirmation signal from the draft identifier 66. This signal also disables the change computation function of the computer 100, since the draft will be drawn to the exact amount of the sale.

The change signals generated by the computer 100 will be transmitted through the conductor lines 101 to a change calculator 110. The change signals will be in the form of a dollar figure, such as $16.41. This signal will be converted by the change calculator 110 into combinations of denominations of bills and coins which can be disbursed by the cash register to the customer for finalizing the transaction. The change calculator 110 accomplishes this conversion by sequentially subtracting from the change signals the demoninations of the bills and coins which are available for disbursal. For example, if the change signal were $16.41, the change calculator 110 will subtract $20.00 from the change signal which will result in a negative number. Therefore, a $20.00 bill will not be disbursed. Next, the change calculator 110 will subtract $10.00 from the change signal giving a positive answer of $6.41. The change calculator 110 will interpret this positive answer as a requirement for a $10.00 bill to be issued. Next, $5.00 will be subtracted leaving a positive answer of $1.41, and a $5.00 bill will be issued. Next, a $1.00 bill will be subtracted and issued leaving 41¢. If more than one of each of the bills is required, the computer will continue subtracting until a negative number is reached. The coins required to provide the exact change will be computed in a similar manner. The command for disbursing coins will be transmitted through the circuit line 114 to the coin changer 30. The commands for bills to be issued are transmitted through a circuit conductor 112 to the change selector 120. While the change calculator 110 is illustrated in FIG. 3 as being separate from the computer 100, the calculations performed by the change calculator 110 may be programmed into the computer 100 if desired.

A refund switch 125 on the keyboard 20 is coupled by a circuit line 141 to a refund limiter 140 which sets a maximum dollar limit on the money which may be refunded by the change calculator 110 without an intervening purchase having been made. The refund limiter 140 may be set to a low dollar figure, such as $3.00, so that a dishonest operator may not drain the money supply within the vault 40 by continually operating the refund switch 125. The refund limiter 140 receives the change signal from the computer 100 through the circuit line 143. The refund limiter 140 then generates an override signal through the circuit line 145 coupled to the change calculator 110 only if the refund demanded by the operator exceed the predetermined the maximum refund allowable by the refund limiter 140. Also, the refund limiter 140 includes a latching function so that the change calculator 110 will be disabled after the first actuation of the refund switch 125 unless a cash sale in excess of the maximum refund limit is transacted prior to the next refund transaction.

The mechanical portions of the anti-theft cash register will now be described with continuing reference to FIGS. 1 and 3. As the bills are inserted through the proper money passageways 44 and the appropriate denominations are identified by the bill identifiers 60a–d, the confirmation signals are also transmitted through the circuit lines 62a-d to the servo amplifier 160. As the money passes the location of the bill identifier 60 in the money passageway 44, the corresponding servo amplifier 160 will be actuated for driving one of the servo mechanisms 166 coupled thereto by the circuit conductors 164a-d. Therefore, the servo 166 paired with the bill identifier 60 will transport the bill through the appropriate money passageway 44 and into a segregated section of the vault 40 reserved for that particular bill denomination. A servo unit in accordance with these requirements is manufactured by DeLaRue Inc. of Great Britian. These units work on a vaccum-transfer principle and can store as many as two thousand bills of each denomination. These units automatically identify and reject worn or damaged bills, as well as automatically transferring any excess bills into an overflow vault. Another similar servo unit 168 will be utilized for the draft passageways 46 and the draft identifier 66.

A similar servo system 176 is utilized for removing the bills from the vault 40 responsive to the commands from the change selector 120. These vaccum transfer units remove one bill at a time from the segregated sections of the vault 40 and transfer the bills through the money conduit 48 for reception by the operator and transfer to the customer as change for closing the transaction. The bills within the segregated sections of the vault 40 are replenished by subsequently received bills. Note that no servo mechanism is provided for removing the drafts from the vault 40.

Figure 4:
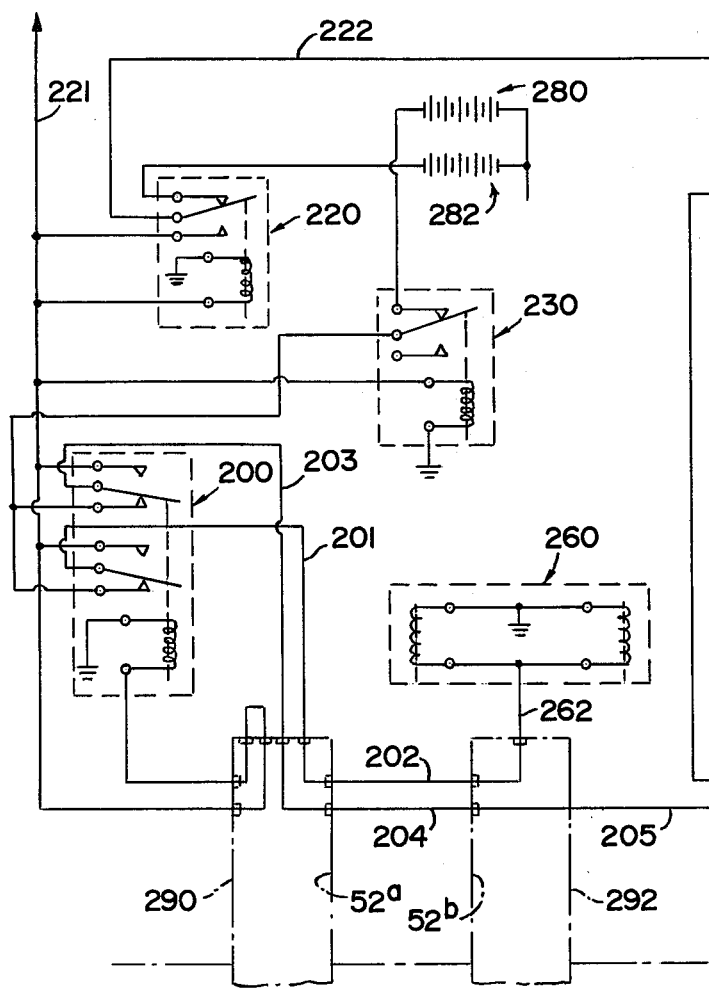
FIG. 4 represents a schematic block diagram of the alarm system coupled to the vault of the cash register.

With reference to FIGS. 1 and 4, the base 42 includes two doors 43 a, b which open into the vault section 40 therewithin. Each of the doors 43 a, b has attached thereto a door interlock switch 248a, b for breaking a circuit line 222 coupled in series therebetween when the doors are opened. The circuit line 222 is coupled by a relay 220 to a source of positive voltage represented by the conductor 221. A battery 282 is coupled to the relay 220 for supplying power thereto when the positive voltage on the line 221 is removed. The voltage on circuit line 222 is coupled through the door interlock switches 248 a, b to actuate a relay 250. When power to the relay 250 is interrupted, the contacts of the relay will open thereby actuating a burglar alarm 270. This alarm 270 may be of the audio, visual or remote type for warning persons in the vicinity or at a security post that the doors have been opened by an unauthorized person or in an unauthorized manner.

Figure 5:
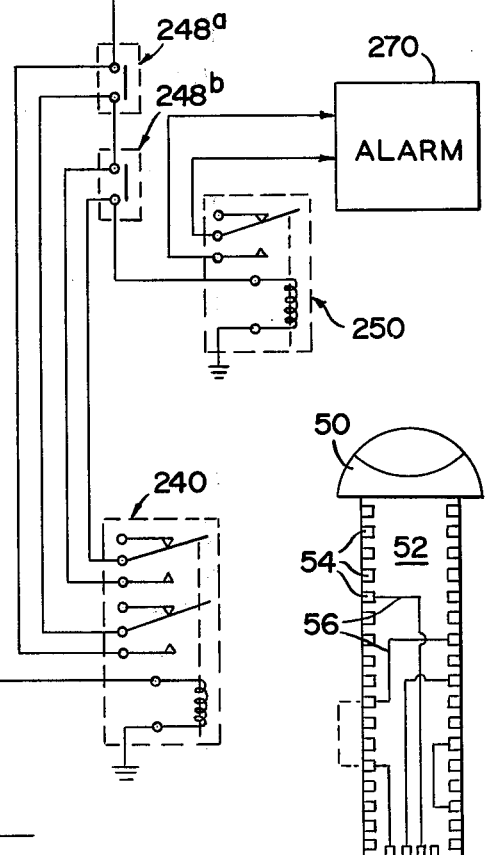
FIG. 5 illustrates a key of the type used in the cash register.

When a first key 290 generally of the type illustrated as 50 in FIG. 5, is inserted into the key slot 52a, the conductors 56 thereon complete the circuit paths whithin the key slot 52a for allowing the positive voltage along the line 221 to be coupled to the coil of a relay 200, thereby actuating the relay. When the relay 200 is actuated, the positive voltage from the line 221 is coupled to the line 201 which in turn is coupled through the first key 290 and into the line 202. If a second key 292 is inserted into the slot 52b, the circuit conductors thereon will couple the positive voltage from the line 202 into the line 262 for supplying power to the door actuators shown generally as 260. As power is applied to the door actuators 260 the locks will be opened, thereby allowing the doors 43 a,b to be opened. The positive voltage from the line 221 is also coupled through the relay 200, the circuit line 203 the first key 290, the circuit line 204, the second key 292 and the circuit line 205 for supplying power to the coil of a relay 240. When the coil of the relay 240 is actuated, the door interlock switches 248 a,b are shorted, thereby disabling the burglar alarm 270 for allowing the doors 43 a,b to be opened without generating an alarm signal.

The relay 220 is coupled to the line 221 for coupling the positive voltage therefrom to the line 222. However, when the positive voltage on the line 221 is interrupted or lost, the relay 220 immediately switches the positive voltage from the battery 282 to the line 222 for maintaining the operation of the door interlock switches and the relay 250 for actuating the burglar alarm 270 in case of an unauthorized access to the vault. In a similar manner the relay 230 is actuated by a loss of voltage on line 221 for coupling the battery 280 to the relay 250 for allowing the door actuators to be operated in the absence of normal power. The computer 100 may also be switched to one of these internal batteries if required. Of course, when the second key 292 is removed from the slot 52b, the doors 43 a,b will be locked shut thereby preventing access to the vault 40. If the first key 290 is removed, the operation of the computer 100 will be disabled for preventing unauthorized access thereto. Also, additional interlock switches may be coupled to the line 220 in a manner similar to the door interlock switches 248. Such interlock switches may be coupled to cables attached to the base 42 of the vault 40 so that an unauthorized penetration to the base 42 and into the vault 40 will be detected.

A preferred embodiment of the anti-theft cash register has been described as an example of the invention as claimed. However, the present invention should not be limited in its application to the details illustrated in the accompanying drawings and the specification, since this invention may be practiced or constructed in a variety of different embodiments. Also, it must be understood that the terminology and descriptions employed herein are used solely for the purpose of describing the general operation of the preferred embodiment and therefore should not be construed as limitations on the operability of the invention.

I claim:

1. An anti-theft cash register comprising in combination:

a vault for storing money therein;

money deposit means for receiving and inserting money into said vault and for generating money deposit signals responsive thereto;

electronic computer means having a first input for receiving said money deposit signals from said money deposit means, and having a second input for receiving data signals for calculating an answer, with said computer means comparing said money deposit signal with said answer and responsive thereto generating change signals at a first output thereof;

money withdrawal means having an input coupled to said first output of said computer means for removing and disbursing money from within said vault responsive to receiving said change signals from said computer means; and primary key means coupled to said computer means, said primary key means comprising a first key having a plurality of isolated electrical conductors communicating between points along the periphery thereof, and a first key receptacle for receiving said first key therein, said first key receptacle having a plurality of circuit leads coupled to said computer means for being selectively coupled by said electrical conductors of said first key only when said first key is properly inserted thereinto.

2. The anti-theft cash register as described in claim 1 wherein said money deposit means comprises means for receiving and separately storing draft, bill and coin type money into said vault.

3. The anti-theft cash register as described in claim 2 wherein said money withdrawal means comprises means for removing and disbursing bill and coin type money from a supply of money within said vault which is replenished by the money received from said money deposit means.

4. The anti-theft cash register as described in claim 3 wherein said money deposit means comprises a plurality of money passageways, each for receiving of draft, bill and coin type money therein for transport to denomination segregated sections of said vault.

5. The anti-theft cash register as described in claim 4 further including denomination identification means coupled to said money deposit means for generating denomination confirmation signals responsive to identifying the denomination of the money, with said denomination confirmation signals being coupled to a third input of said computer means.

6. The anti-theft cash register as described in claim 5 wherein said computer means further includes identification interlock means for generating said change signal responsive to receiving said denomination confirmation signals representing denominations which total in excess of said answer.

7. The anti-theft cash register as described in claim 6 further comprising identification override means coupled to said identification interlock means for selectably disabling said identification interlock means.

8. The anti-theft cash register as described in claim 7 further comprising refund limit means coupled to a fourth input of said computer means for limiting said change signals to a predetermined maximum limit responsive to the absence of said denomination confirmation signals being received by said computer means.

9. The anti-theft cash register as described in claim 8 wherein said refund limit means further comprises latching means for disabling said change signals upon a second consecutive actuation of said refund limit means.

10. The anti-theft cash register as described in claim 9 further comprising change override means coupled to said computer means for selectively disabling said change signals.

11. The anti-theft cash register as described in claim 8 further comprising change calculator means interposed between said computer means and said money withdrawal means for calculating the number of each denomination of bill and coin type money required to equal said change signal, with said change calculator means generating change denomination signals responsive thereto.

12. The anti-theft cash register described in claim 11 wherein said money withdrawal means comprises in combination;
a plurality of money conduits, each coupled to one of said denomination segregated sections of said vault for removing and disbursing a demonimation of said bill and coin type money therethrough; and
a plurality of motive means each coupled to one of said money conduits for removing each denomination of the money through said money conduit paired therewith, with each of said motive means coupled to said change calculator means for operating responsive to receiving one of said change denomination signals therefrom.

13. The anti-theft cash register as described in claim 12 further including keyboard means for generating said data signals for being coupled to said computer means, with said keyboard means comprising;
numeric switches for generating number data signals;
function switches for generating function data signals representing arithmetic functions to be performed on said number data signals; and
transaction switches for generating transaction data signals representing instructions to said computer means as to the type of transaction occuring.

14. The anti-theft cash register as described in claim 13 wherein said transaction keys comprise;
a draft sales switch for actuating said changer override means;
a refund key for actuating said refund limit means; and
damaged bill key for actuating said identification override means.

15. The anti-theft cash register as described in claim 1 wherein said vault includes alarm means coupled thereto for generating an alarm signal responsive to an unauthorized entry into said vault.

16. The anti-theft cash register as described in claim 15 wherein said alarm means includes sensors coupled to vault access doors for actuating said alarm signal responsive to detecting the unauthorized opening thereof.

17. The anti-theft cash register as described in claim 16 further comprising a second key for coupling with and disabling said alarm means, whereby authorized entry into said vault may be obtained through said vault access doors without actuating said alarm means.

18. The anti-theft cash register as described in claim 17 further comprising power changeover means for switching to an internal battery for supplying power to said alarm means responsive to the loss of a primary source of power.

* * * * *